US008844109B2

(12) United States Patent
Meyer et al.

(10) Patent No.: US 8,844,109 B2
(45) Date of Patent: Sep. 30, 2014

(54) METHOD FOR THE MANUFACTURE OF MOTOR VEHICLES

(75) Inventors: Christian Meyer, Schkeuditz (DE); Ralf Schuster, Wiedemar (DE); Lutz Muller, Taucha (DE); Pascal Kauffelin, Langenbernsdorf (DE)

(73) Assignee: Dr. Ing.h.c.F.Porsche Aktiengesellschaft, Stuttgart (DE)

( * ) Notice: Subject to any disclaimer, the term of this patent is extended or adjusted under 35 U.S.C. 154(b) by 1158 days.

(21) Appl. No.: 12/411,910

(22) Filed: Mar. 26, 2009

(65) Prior Publication Data
US 2009/0260215 A1    Oct. 22, 2009

(30) Foreign Application Priority Data

Apr. 22, 2008 (DE) .......... 10 2008 020 083

(51) Int. Cl.
| B23P 11/00 | (2006.01) |
| B23P 21/00 | (2006.01) |
| G05B 19/418 | (2006.01) |
| G06Q 10/06 | (2012.01) |
| B62D 65/00 | (2006.01) |

(52) U.S. Cl.
CPC .......... *B62D 65/00* (2013.01); *G05B 19/41865* (2013.01); *G06Q 10/06* (2013.01); *G05B 19/41805* (2013.01); *G05B 2219/31384* (2013.01)
USPC ............. 29/430; 29/429; 29/469; 29/822; 29/793; 29/794

(58) Field of Classification Search
USPC ......... 29/429, 430, 469, 793, 794, 822, 897.2
See application file for complete search history.

(56) References Cited

U.S. PATENT DOCUMENTS

| 2,757,447 | A | * | 8/1956 | Barenyi ..................... 29/430 |
| 4,392,601 | A | * | 7/1983 | Fujikawa et al. ............ 228/4.1 |
| 4,441,645 | A | * | 4/1984 | Takagishi et al. ........... 228/49.6 |
| 4,669,168 | A | * | 6/1987 | Tamura et al. .............. 29/429 |
| 4,670,961 | A | * | 6/1987 | Fontaine et al. ............ 29/429 |

(Continued)

FOREIGN PATENT DOCUMENTS

| DE | 202 20 469 U1 | 9/2003 |
| DE | 102 21 733 A1 | 11/2003 |

(Continued)

OTHER PUBLICATIONS

English machine translation of JP 2002362443.*

*Primary Examiner* — Essama Omgba
(74) *Attorney, Agent, or Firm* — Gerald E. Hespos; Michael J. Porco; Matthew T. Hespos

(57) ABSTRACT

A method for manufacturing motor vehicles at a manufacturing location (S), from which ready-assembled motor vehicles are built in a planned number and order of output. First modules ($M_A$) are delivered in a specific assembly stage discontinuously from a first production shop ($P_A$) to the manufacturing location (S) and are fed continuously into a manufacturing line (F) in which the modules ($M_A$) are manufactured into motor vehicles (A). Second modules ($M_B$) be fed in a specific assembly stage from a second production shop ($P_B$) into the joint manufacturing line (F) at a sequencing station (5) alternately with the modules ($M_A$). Thus, vehicles of first and second model series can be manufactured on one and the same manufacturing line.

13 Claims, 1 Drawing Sheet

(56) References Cited

U.S. PATENT DOCUMENTS

| | | | | |
|---|---|---|---|---|
| 4,730,870 | A * | 3/1988 | DeRees | 296/193.04 |
| 4,767,046 | A * | 8/1988 | Kumagai et al. | 228/4.1 |
| 4,900,083 | A * | 2/1990 | Kumasaka et al. | 296/193.04 |
| 5,090,105 | A * | 2/1992 | DeRees | 29/469 |
| 5,386,621 | A * | 2/1995 | Fluegge et al. | 29/705 |
| 6,226,848 | B1 * | 5/2001 | Kurtz | 29/407.01 |
| 6,453,209 | B1 * | 9/2002 | Hill et al. | 700/95 |
| 6,470,559 | B1 * | 10/2002 | Spaulding et al. | 29/469.5 |
| 6,493,920 | B1 * | 12/2002 | Hill et al. | 29/469 |
| 6,539,332 | B1 * | 3/2003 | Muller et al. | 702/173 |
| 6,772,027 | B2 * | 8/2004 | Kurihara | 700/99 |
| 6,836,943 | B2 * | 1/2005 | Chernoff et al. | 29/402.08 |
| 6,915,571 | B2 * | 7/2005 | Hosono et al. | 29/897.2 |
| 7,269,900 | B2 * | 9/2007 | Moriya et al. | 29/897.2 |
| 8,001,680 | B2 * | 8/2011 | Klemm | 29/783 |
| 8,302,281 | B2 * | 11/2012 | Kilibarda | 29/430 |
| 8,356,403 | B2 * | 1/2013 | Woo et al. | 29/823 |
| 8,424,206 | B2 * | 4/2013 | Tanahashi | 29/897.2 |
| 8,713,799 | B2 * | 5/2014 | Kllibarda | 29/897.2 |
| 2002/0152615 | A1 * | 10/2002 | Kurihara | 29/897 |
| 2002/0162209 | A1 * | 11/2002 | Hosono et al. | 29/430 |
| 2003/0189085 | A1 * | 10/2003 | Kilibarda et al. | 228/212 |
| 2004/0052621 | A1 | 3/2004 | Beerhalter et al. | |
| 2005/0102813 | A1 | 5/2005 | Boettcher et al. | |
| 2005/0236461 | A1 * | 10/2005 | Kilibarda et al. | 228/101 |
| 2006/0074778 | A1 * | 4/2006 | Katou et al. | 705/28 |
| 2008/0052895 | A1 * | 3/2008 | Klemm | 29/592 |
| 2008/0069673 | A1 * | 3/2008 | Tsujihama | 414/353 |
| 2008/0084013 | A1 * | 4/2008 | Kilibarda | 269/37 |
| 2008/0223692 | A1 * | 9/2008 | Tanahashi | 198/618 |
| 2008/0295335 | A1 * | 12/2008 | Kilibarda et al. | 29/897.2 |
| 2010/0263191 | A1 * | 10/2010 | Kllibarda | 29/430 |
| 2012/0036701 | A1 * | 2/2012 | Kilibarda | 29/430 |
| 2012/0137490 | A1 * | 6/2012 | Kweon et al. | 29/428 |

FOREIGN PATENT DOCUMENTS

| | | | | |
|---|---|---|---|---|
| DE | 103 47 609 A1 | | 5/2005 | |
| JP | 58016964 | | 1/1983 | |
| JP | 61160369 A | * | 7/1986 | |
| JP | 62110579 A | * | 5/1987 | B62D 65/00 |
| JP | 02003584 A | * | 1/1990 | B62D 65/00 |
| JP | 3072520 | | 3/1991 | |
| JP | 4354632 | | 12/1992 | |
| JP | 2000042871 | | 2/2000 | |
| JP | 2001247064 A | * | 9/2001 | B62D 65/02 |
| JP | 2002068039 A | * | 3/2002 | B62D 65/10 |
| JP | 2002362443 A | * | 12/2002 | B62D 65/18 |
| JP | 2008094371 A | * | 4/2008 | B62D 65/00 |

* cited by examiner

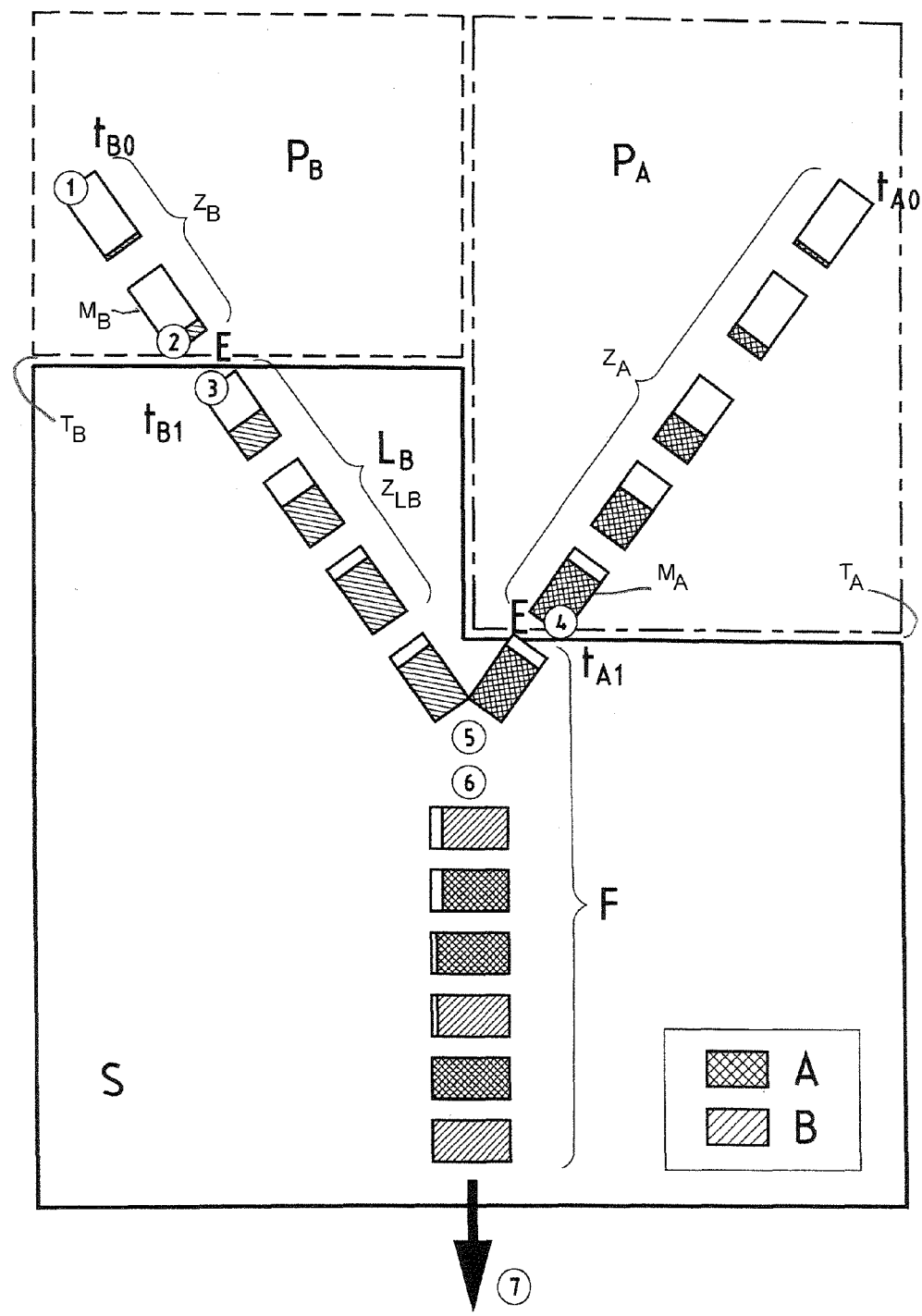

METHOD FOR THE MANUFACTURE OF MOTOR VEHICLES

CROSS-REFERENCE TO RELATED APPLICATION

This application claims priority under 35 USC 119 to German Patent Application No. 10 2008 020 083.2 filed on Apr. 22, 2008, the entire disclosure of which is incorporated herein by reference.

BACKGROUND OF THE INVENTION

1. Field of the Invention

The invention relates to a method for the manufacture of motor vehicles.

2. Description of the Related Art

Series vehicle construction requires suppliers to make modules available on the manufacturing line in due time and in the necessary quantity for producing the motor vehicles. Furthermore, just-in-sequence production has been adopted in series vehicle construction to deliver the modules in the order in which they are processed. The lead time for the delivered modules depends on the manufacturing duration of the modules, on the delivery distance and on the degree of bundling during the transport of the modules.

DE 102 21 733 A1 discloses a manufacturing method in which vehicle bodies are the modules that are to be delivered. The vehicle bodies are manufactured in a geographically remote production shop up to tally point without chassis, wheels and engine. Modules are transported in a defined number and predetermined call-up sequence from this production shop to the manufacturing location by rail. The modules are unloaded from the rail wagons at an unloading station. The unloaded modules then are separated and fed into the manufacturing line. However, only vehicles of a model series with an identical assembly stage can be manufactured by this known method.

The object of the invention, therefore, is to develop a method for manufacturing motor vehicles, with the advantageous just-in-sequence delivery being preserved, but enabling at least part of the manufacturing of vehicles of two different model series to be performed on one and the same manufacturing line.

SUMMARY OF THE INVENTION

The invention relates to the production of two modules that may be manufactured in different assembly stages and at other production locations. However, the production is synchronized so that the modules of the two model series are brought together in the correct sequence at a sequencing station at the manufacturing location. For this purpose, the first modules are delivered discontinuously from a first production location by a transport means, for example by rail in wagons. The second modules are loaded onto the transport means, for example at a reduced assembly stage, at a second production location and likewise are transported discontinuously to the manufacturing location. The two modules are unloaded alternately, fully sorted out, from the transport means at a joint unloading station and are fed continuously into manufacture. The first modules are fed into the joint manufacturing line alternately with the second modules at a sequencing station and are made ready for dispatch there up to a tally point.

The alternation of the modules at the sequencing station may be determined as a function of the planned number and order of output of the motor vehicles. Alternatively, however, it is also conceivable that the first modules and then the second modules are fed into the joint manufacturing line.

The first modules may be brought directly to the sequencing station. However, the sequencing station may be preceded at the manufacturing location by an assembly line for the second modules so that the assembly stage of the second modules is increased at the manufacturing. Both model series are fed into the joint manufacturing line at the sequencing station according to the planned order of output, but only when both model lines have reached the same assembly stage.

The determination of the time when the production of an individual module must be started at its production location may take place as a function of the planned number and of the order of output.

A large unloading area generally is required for rail transport. Accordingly, the two modules preferably are unloaded at the manufacturing location at one and the same unloading station. Therefore, space for only one unloading station needs to be provided. Unloading may take place in shifts, depending on capacity utilization.

The determination of the time for unloading the modules at the joint unloading station may take place as a function of the demands and of the call-up sequence. Shorter intervals are provided between the individual unloading cycles when the output is higher.

Alternatively or additionally, the determination of the time for unloading the modules may take place as a function of the manufacturing time of the modules and/or of the transport time of the modules.

A preferred exemplary embodiment of the invention is explained in more detail with reference to the single FIGURE.

BRIEF DESCRIPTION OF THE DRAWING

The FIGURE is a diagrammatic illustration of a method for manufacturing motor vehicles.

DETAILED DESCRIPTION OF THE PREFERRED EMBODIMENT

The FIGURE illustrates a joint manufacturing line F at a manufacturing location S for manufacturing motor vehicles A of a first model series and motor vehicles B of a second model series. The progress of the manufacture of the vehicles A, B is illustrated by increasingly filled-out rectangles in the illustration. A higher degree of filling denotes a more advanced assembly stage. The number of vehicles and the order of output may be laid down or stored electronically in a factory calendar. The shift model and the national holidays are taken into account in this factory calendar.

The method comprises the manufacture of two modules $M_A$ and $M_B$ that are manufactured at different production locations $P_A$ and $P_B$. The modules $M_A$ and $M_B$ are manufactured, up to dispatch to the manufacturing location S, in a defined times $Z_A$ and $Z_B$ that are composed in each case of the manufacturing times of the individual manufacturing steps.

The modules $M_A$ and $M_B$ from the production locations $P_A$ and $P_B$ in each case are bundled and transported in due time and in the correct order to the manufacturing location S. Bundled transport preferably takes place by rail in wagons.

The transport times $T_A$ and $T_B$ depend on the distance of the production locations $P_A$ and $P_B$ from the manufacturing location S and on the speed of the transport means.

The loading and unloading of the prefabricated modules into the wagons and out of the wagons may take place fully or partially automatically by means of a loading and unloading system, as described, for example, in DE 102 21 733 A1 or DE 103 47 609 A1. In this case, there is provision for the unloading of the wagons to take place at a joint unloading station E at the manufacturing location S. Thus, for example, the modules $M_A$ can be unloaded in a first shift and the modules $M_B$ can be unloaded in a second shift. The respective modules $M_A$ and $M_B$ then can be fed gradually into manufacture. Buffering or storage of the delivered modules $M_A$ and $M_B$ that might otherwise be necessary is reduced considerably due to delivery in the correct order.

The modules $M_A$ and $M_B$ may have manufacturing depths different from one another, that is to say, the modules $M_A$ and $M_B$ differ from one another in the degree of the assembly stage. The module $M_A$ is, for example, a vehicle body that has been manufactured at the production location $P_A$ up to what is known as tally point 6. The module $M_A$ therefore is ready-assembled, with the exception of the installation of the engine/chassis, top, wheel mounting and filling. In contrast, the module $M_B$ merely comprises a lacquered body, that is to say, the module $M_B$ is completed up to what is known as tally point 5.

At the manufacturing location S, the lacquered body (module $M_B$) is completed up to tally point 6 on an assembly line $L_B$ following the unloading station E. The manufacturing time $Z_{LB}$ is composed of the processing times of the individual manufacturing steps.

The modules $M_A$ and $M_B$ that are being fed in at the sequencing station 5 have an identical manufacturing depth or assembly stage, so that both vehicles A and B can be completed together on the joint manufacturing line F from tally point 6 to tally point 8.

Smooth interaction of the production locations $P_A$ and $P_B$ with the manufacturing location S is organized as described below.

The demand and the call-up sequence of the modules $M_A$ and $M_B$ at points 4 and 2 respectively, of the unloading station E, arise from the number planned in the factor calendar, and the order of output of the vehicles at the end of the joint manufacturing line F, which is identified in the FIGURE by the arrow 7. The demand and the call-up sequence are transferred to the production locations $P_A$ and $P_B$. In this case, a synchronization of the production programs between the individual production locations $P_A$ and $P_B$ takes place, for example, to balance out different holidays or holiday times.

The starting timepoint $t_{A0}$ of the production of the module $M_A$ and the starting timepoint $t_{B0}$ of the production of the module $M_B$ are determined from the required demands and call-up sequences as a function of the manufacturing times $Z_A$ and $Z_B$. In this case, account must be taken of the fact that the module $M_B$ has to be delivered at the unloading station E at a timepoint $t_{B1}$ which in time lies before the timepoint $T_{A1}$ of delivery of the module $M_A$. Thus, the modules $M_B$ can be manufactured on the assembly line $L_B$ as far as the sequencing station 5. The transport means that connect the respective production locations $P_A$ and $P_B$ to the manufacturing location are loaded subsequently with the modules $M_A$ and $M_B$ in a defined order of loading. This order of loading is transferred to the manufacturing location S. Insofar as inconsistencies are detected between the order of loading and the planned order of output, an adjustment of the data can take place during the transport time $T_A$ or $T_B$ and an actual order deviating from the planned order of output can be laid down at the sequencing station.

The manufacturing method described is also suitable for the joint manufacture of models of identical manufacturing depth or assembly stage. The determination of the demands and call-up sequence for the production locations then is simplified.

What is claimed is:

1. A method for manufacturing motor vehicles at a manufacturing location, from which first and second models of fully assembled motor vehicles are discharged in a planned number and order of output, the first and second models being different from one another, the method comprising: bundling first modules of the first model bodies in a first specific assembly stage at a first production shop and in a bundled order conforming to the order of output and a travel time between the first production shop and the manufacturing location to define first bundled modules, discontinuously delivering the first bundled modules from the first production shop to the manufacturing location, feeding the first models in the first specific assembly stage and in the bundled order into a sequencing station at an entry to a joint manufacturing line at the manufacturing location, bundling second modules of the second model bodies at a second production shop in a second specific assembly stage that is less fully developed than the first specific assembly stage, the bundling being carried out to produce second bundled modules having a bundled order conforming to the order of output and a travel time between the second production shop and the manufacturing location, delivering the second bundled modules to the manufacturing location, manufacturing the second modules at the manufacturing location so that the second modules reach an assembly stage at the manufacturing location that is equivalent to the first specific assembly stage, feeding the second modules into the joint manufacturing line at the sequencing station alternately with the first modules in an alternating sequence to achieve the planned number and order of each of the models, and completing the manufacturing of both of the models in the joint manufacturing line, wherein timepoints for starting production of the modules is determined as a function of the planned number and of the order of output.

2. The method of claim 1, characterized in that the modules are unloaded at the manufacturing location at a joint unloading station.

3. The method of claim 1, characterized in that timepoints for unloading the modules at the joint unloading station is determined as a function of demands and of a call-up sequence.

4. The method of claim 1, characterized in that timepoints for unloading the modules is determined as a function of the manufacturing time of the modules.

5. The method of claim 1, characterized in that timepoints for unloading the first and second modules is determined as a function of transport time of the first and second modules from the respective first and second production shops to the manufacturing location.

6. The method of claim 1, characterized in that a loading timepoint of the modules takes place in due time according to the transport time.

7. A method for manufacturing motor vehicles, comprising:
   determining demands for vehicles of a first model series and demands for vehicles for a second model series that is different from the first model series;
   partly producing a plurality bodies of vehicles of the first model series at a first production site to meet the demands for the first model series;
   bundling the partly produced bodies of the first model series at the first production site in an order conforming to the demands for the vehicles of the first model series and a travel time from the first production site to a single manufacturing location, thereby producing first bundles;

partly producing a plurality of bodies of the second model series at a second production site to meet the demands for the vehicles of the second model series, the bodies of the second model series being produced to a less complete stage at the second production site as compared to a stage of completion of the bodies of the first model series produced at the first production site;

bundling the partly produced bodies of the second model series at the second production site in an order conforming to the demands for the vehicles of the second model series and a travel time from the second production site to the single manufacturing location, thereby producing second bundles;

transporting the first and second bundles from the first and second production sites to the single manufacturing location;

performing additional production on the vehicles of the second model series at the manufacturing location;

sequentially feeding the vehicles of the first and second model series into a sequencing station of a single manufacturing line at the manufacturing location and in an alternating sequence that is selected to meet the respective demands for the vehicles of the first and second model series; and completing manufacture of the vehicles of the first and second model series at the single manufacturing line at the manufacturing location.

8. The method of claim 7, further comprising inputting call-up sequences of the vehicles of the first and second models series, and wherein the step of transporting the partly produced vehicles from the first and second production sites to the manufacturing location and the step of sequentially feeding the vehicles of the first and second model series into the single manufacturing line are carried out to meet the call-up sequence of the vehicles of the first and second models series.

9. The method of claim 7, further comprising bundling the vehicles of the first and second models series into first and second modules at the first and second production sites, the transportation step comprising transporting the first and second modules, the method further comprising unbundling the modules at the manufacturing location.

10. The method of claim 7, wherein the step of completing manufacture of the first and second model series at the single production line comprises installing an engine and chassis at the single manufacturing location into bodies of the first and second model series received respectively from the first and second production sites.

11. The method of claim 7, wherein the step of completing manufacture of the first and second model series at the single production line further comprises installing wheels.

12. The method of claim 7, wherein the step of partly producing vehicles of the first and second model series at the respective first and second production sites comprises at least producing a lacquered vehicle body.

13. A method for manufacturing motor vehicles, comprising:

determining demands for vehicles of a first model series and demands for vehicles for a second model series;

at least partly producing bodies of the vehicles of the first model series at a first production site to meet the demands for the first model series;

bundling the partly produced bodies of the vehicles of the first model series at the first production site in an order conforming to the demands for the vehicles of the first model series and a travel time from the first production site to a single manufacturing location, thereby producing first bundles;

at least partly producing bodies of the vehicles of the second model series at a second production site to meet the demands for the vehicles of the second model series, the vehicles of the second model series being produced to a less complete stage at the second production site as compared to a stage of completion of the vehicles of the first model series produced at the first production site;

bundling the partly produced bodies of the vehicles of the second model series at the second production site in an order conforming to the demands for the vehicles of the second model series and a travel time from the second production site to a single manufacturing location, thereby producing second bundles;

transporting the first and second bundles from the first and second production sites to the single manufacturing location;

performing additional production on the vehicles of the second model series at the manufacturing location;

sequentially feeding the at least partly produced bodies of the vehicles of the first and second model series into a sequencing station of a single manufacturing line at the manufacturing location and in an alternating sequence to meet the respective demands determined for the vehicles of the first and second model series; and completing manufacture of the vehicles of the first and second model series by assembling the at least partly completed bodies of the first and second model series to respective engines, chassis and wheels for the respective first and second model series at the single manufacturing line at the manufacturing location.

* * * * *